(12) United States Patent
O'Connor

(10) Patent No.: US 7,393,056 B2
(45) Date of Patent: Jul. 1, 2008

(54) VEHICLE SEAT RELEASE ASSEMBLY

(75) Inventor: James G. O'Connor, Oxford, MI (US)

(73) Assignee: Lear Corporation, Southfield, MI (US)

( * ) Notice: Subject to any disclaimer, the term of this patent is extended or adjusted under 35 U.S.C. 154(b) by 393 days.

(21) Appl. No.: 11/126,870

(22) Filed: May 11, 2005

(65) Prior Publication Data
US 2006/0255637 A1    Nov. 16, 2006

(51) Int. Cl.
*B60N 2/02* (2006.01)
(52) U.S. Cl. .............. 297/378.12; 297/378.14; 297/336; 296/65.16
(58) Field of Classification Search ............ 296/65.16; 297/326, 331, 336, 378.1, 378.12, 378.14
See application file for complete search history.

(56) References Cited

U.S. PATENT DOCUMENTS

| | | | |
|---|---|---|---|
| 4,076,309 A | 2/1978 | Chekirda et al. | 297/363 |
| 4,103,970 A | 8/1978 | Homier | 297/363 |
| 4,627,656 A | 12/1986 | Gokimoto et al. | 296/65 R |
| 5,466,048 A | 11/1995 | Fowler et al. | 297/378.12 |
| 5,498,052 A | 3/1996 | Severini et al. | 296/65.1 |
| 5,577,805 A * | 11/1996 | Glinter et al. | 297/378.12 |
| 5,641,202 A | 6/1997 | Rus | 297/335 |
| 5,673,972 A | 10/1997 | Dudash et al. | 297/378.12 |
| 5,842,744 A | 12/1998 | Harmon | 297/378.11 |
| 5,941,591 A | 8/1999 | Tsuge et al. | 296/65.09 |
| 6,170,898 B1 | 1/2001 | Cunningham, II et al. | 296/65.16 |
| 6,293,603 B1 * | 9/2001 | Waku et al. | 296/65.09 |
| 6,345,867 B1 * | 2/2002 | Hellrung et al. | 297/336 |
| 6,679,536 B1 | 1/2004 | Sonnenberg et al. | 296/65.09 |
| 6,698,837 B2 * | 3/2004 | Pejathaya et al. | 297/378.12 |
| 6,786,543 B2 | 9/2004 | Andersson et al. | 297/216.13 |
| 6,786,551 B2 | 9/2004 | Brewer et al. | 297/378.12 |
| 6,832,815 B2 | 12/2004 | O'Connor | 297/378.12 |
| 6,863,347 B2 | 3/2005 | De Nichilo | 297/378.12 |
| 6,910,739 B2 * | 6/2005 | Grable et al. | 297/378.12 |
| 6,932,409 B2 * | 8/2005 | Falchero et al. | 296/65.09 |
| 7,201,425 B2 * | 4/2007 | Tsujibayashi et al. | 296/65.09 |
| 2001/0028189 A1 | 10/2001 | Klein | 297/378.12 |
| 2003/0102705 A1 | 6/2003 | Pejathaya et al. | 297/378.12 |

FOREIGN PATENT DOCUMENTS

| | | |
|---|---|---|
| DE | 10342724 A1 | 4/2005 |
| FR | 2852272 A1 | 9/2004 |

* cited by examiner

*Primary Examiner*—Joseph F Edell
(74) *Attorney, Agent, or Firm*—Bliss McGlynn, P.C.

(57) ABSTRACT

A vehicle seat includes a seat backrest, bottom, and frame. The seat frame operatively supports the seat bottom and further has a seat backrest rotating assembly that is adapted to allow the seat backrest to move between an upright position and a folded position in which the seat backrest is folded down upon the seat bottom. A hinge mechanism allows the rear of the seat frame to be rotatively lifted upward and forward to move the seat frame to a tumbled position. A first latching mechanism is adapted to latch the seat backrest in the upright position. A second latching mechanism is adapted to latch the seat bottom to the vehicle floor. A release assembly is adapted to cause the first and the second latching mechanisms to be selectively released and has a release member and a pulley assembly to provide a mechanical advantage for operating the release assembly.

7 Claims, 4 Drawing Sheets

VEHICLE SEAT RELEASE ASSEMBLY

BACKGROUND OF THE INVENTION

1. Field of the Invention

The present invention relates, generally, to a vehicle seat having a release assembly and, more specifically, to a fold and tumble vehicle seat having a release pulley system to operate the latch assemblies of the seat.

2. Description of the Related Art

To satisfy the demands of the modern driving public, manufacturers are called upon to provide vehicles that are multi-functional and, in addition to having normal passenger carrying capacity, also provide expandable or additional cargo carrying capability. One way to accomplish this goal and increase the vehicle's cargo space to accommodate large or bulky items that need to be transported is to flatten, fold, and/or collapse one or more of the rear seat assemblies. A conventional approach of collapsing rear vehicle seat assemblies to provide additional storage space is one in which the seat backrest portion folds down onto the seat cushion and then the rear of the seat support assembly is released from the vehicle floor so that the entire seat pivots, or tumbles, forward about the front floor mounting. These seats generally, and their support assemblies more specifically, are referred to as "fold and tumble."

Fold and tumble seat designs vary greatly and are used in different ways in different vehicle types. Fold and tumble seats often appear in 3 and 5 door vehicles in which the rear, or secondary seating is folded and tumbled to open up a rear cargo area when desired. Fold and tumble seats are also employed in mini-vans and SUVs where the secondary seats may fold and tumble to provide ingress and egress to third row seating or to provide additional cargo space if the third row is folded down or removed. Regardless of their specific application, the current fold and tumble seat designs and the manner in which the folded seat tumbles have proven to be problematic.

While the various second row fold and tumble seat approaches have been generally worked for their intended purpose, they tend to be either heavy and difficult to operatively stow or too lightweight to provide the proper support and comfort. Second row seating in a van or SUV type vehicle must typically function as a second family seating area similar to the more robust permanent backseat of a sedan. Second row seating is also often required to hold child and/or booster seats. Thus, if a fold and tumble seat is designed to be very easy for one person to fold and tumble to the stowed position, they tend to be lightweight and more in the realm of a jump seat. The lightweight fold and tumble seats sometimes do not stand up well to continued second row regular use.

If a fold and tumble seat is designed as a more rigorous second row seat that is capable of properly supporting child seats and withstanding constant usage, the resultant seat is sturdier and usually but much heavier. This, by itself, does not make the seat undesirable. However, it tends to make the seat difficult to fold and tumble to the stowed position as originally intended. More specifically, a fold and tumble seat includes hinge mechanisms at the front of the seat, a floor latching mechanism to secure the rear of the seat to the floor, and a seat back latching mechanism to lock the seat back in the upright position. When it is desired to fold and tumble the seat to the stowed position, the seat back and floor latch mechanisms must be physically released by an operator. In operation, the seatback latching mechanism must be first released, and then the seat back is folded forward onto the seat bottom. The operator must then release the floor latching mechanism while attempting to lift the rear of the seat and rotate it forward. Considering the weight and structure of the more substantial types of fold and tumble seats, the release of the seatback and floor latching mechanisms can be difficult for a great many individuals.

Additionally, fold and tumbling stowage is often performed through an open side door or sliding door with the operator standing outside and leaning in. In the case of a van type vehicle with a sliding door installed on only one side, the far side fold and tumble seat must be stowed with the operator in the vehicle compartment kneeling behind or to the side of the seat. Further, depending upon the configuration of the vehicle, some second row fold and tumble seating must be stowed by a third row occupant to make room for the third row occupant to egress the rear of the vehicle. In any case, the operator attempting the fold and tumble operation generally does not have a good position for balance and leverage while releasing the latching mechanisms and performing the stow. This disadvantage to fold and tumble seating is compounded when a smaller individual or one with lower upper body strength attempts to release the latching mechanisms to perform the stowing operation. Some attempts have been made to simplify the release operation by combining the seatback latch release with the floor latch release. However, while this provides the advantage of a single release operation instead of two separate release actions, it requires an even greater physical effort to simultaneously overcome the load placed on both the release mechanisms. Thus, there remains a need in the art for a fold and tumble vehicle seat having a release assembly that provides a mechanical advantage to the operator so that the release of the latching mechanisms may be performed with minimal operator input.

SUMMARY OF THE INVENTION

The disadvantages of the related art are overcome by the present invention that provides a vehicle seat assembly including a seat backrest, a seat bottom, and a seat frame having a front member and a rear member. The seat frame operatively supports the seat bottom and further has at least one seat backrest rotating assembly supported at the rear member that is adapted to allow the seat backrest to move between an upright position and a folded position in which the seat backrest is folded down upon the seat bottom. The seat frame further has at least one hinge mechanism disposed on the front member to allow the rear member of the seat frame to be rotatively lifted upward and forward and move the seat frame from a seating position to a tumbled position relative to the front member. A first latching mechanism is adapted to latch and selectively retain the seat backrest in the upright position. A second latching mechanism is adapted to latch and selectively retain the seat bottom to the floor of the vehicle. A release assembly is adapted to selectively cause both the first and the second latching mechanisms to be released when the release assembly is actuated. The release assembly has a release member and a pulley assembly to provide a mechanical advantage for operating the release assembly with the release member.

Thus, the present invention provides a fold and tumble vehicle seat assembly with a release assembly having a release member and a pulley assembly that provides a mechanical advantage for an operator releasing the latching mechanisms of the seat so that the seat may be easily released from any position and by any operator.

Other objects, features and advantages of the present invention will be readily appreciated as the same becomes

DETAILED DESCRIPTION OF THE PREFERRED EMBODIMENT(S)

Figure 1:
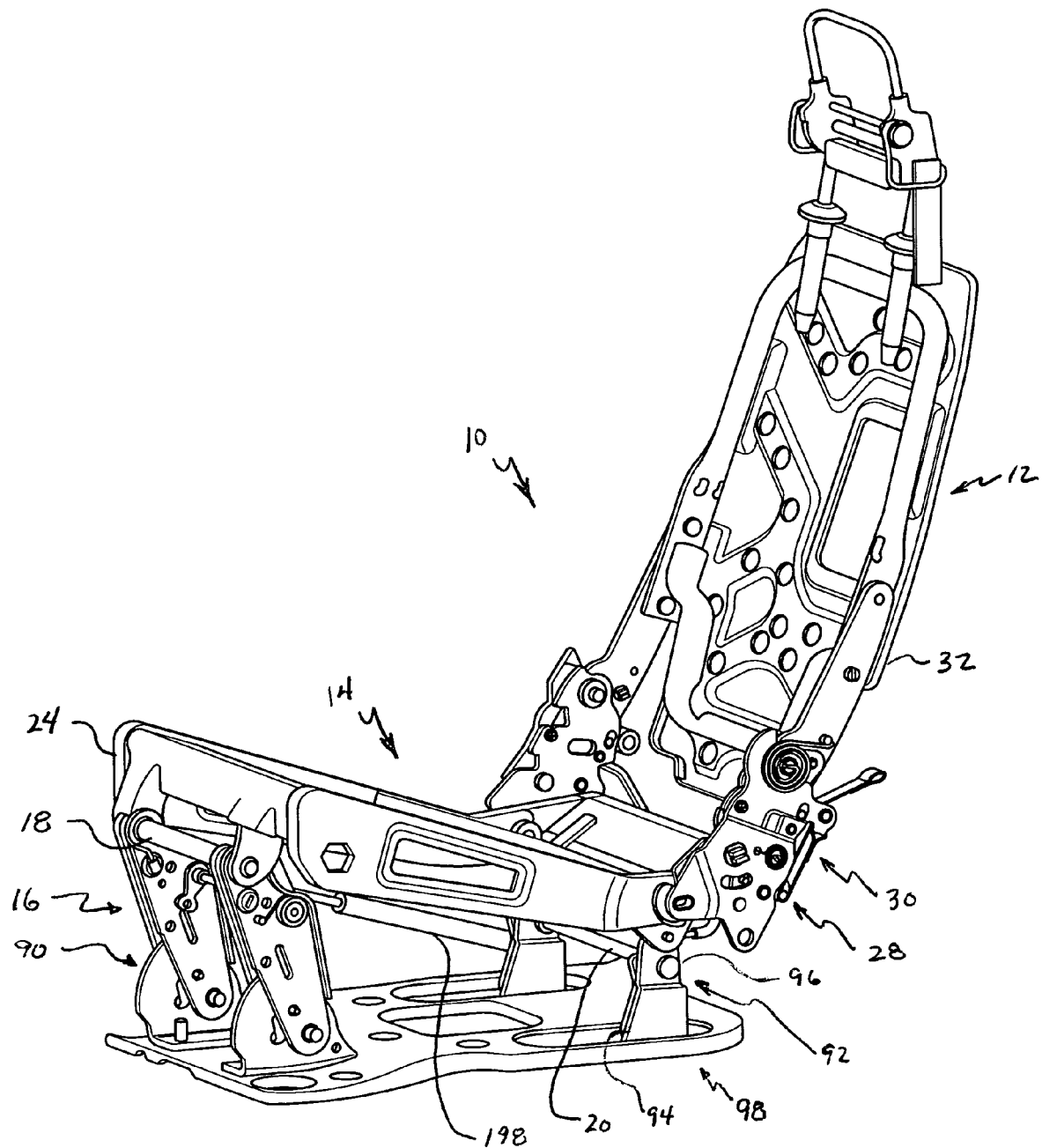
FIG. 1 is a side perspective view of a vehicle seat assembly of the present invention in the upright position without cushions and trim.

A fold and tumble vehicle seat having a release assembly of the present invention is generally indicated as 10 in FIG. 1 where like numerals are employed to designate like structure throughout the figures. The seat assembly 10 is illustrated without padding and trim and includes a seat backrest generally indicated at 12, a seat bottom generally indicated at 14, and a seat frame generally indicated at 16. The seat frame 16 has a front member 18 and a rear member 20. In the preferred embodiment, the seat bottom 14 is a pan 24 that is integrated with the seat frame 16 such that the front and rear members 18 and 20 are disposed in spaced parallel relationship on the seat pan 24. It should be appreciated by those of ordinary skill in the art that the seat bottom and seat frame may also be separate elements with the seat frame including side members that operatively support the front and rear members. The seat pan 24 is formed or stamped from any one of a variety of moldable or malleable materials in a known manner to provide a generally flat shaped pan, which supports a seat cushion (not shown). In addition and as noted above, those having ordinary skill in the art will appreciate that in its operational mode the seat assembly 10 also includes foam padding and a class "A" external covering.

As further illustrated in FIG. 1, the seat frame 16 also supports at least one backrest rotating assembly, generally indicted at 28, and a release assembly, generally indicated at 30. The backrest rotating assembly 28 is mounted to the rear member 20 and the seat pan 24. The seat backrest 12 includes a backrest frame 32, which is also mounted to the seat backrest rotating assembly 28. The seat backrest rotating assembly 28 is adapted to allow the seat backrest 12 to move between an upright position and a folded position in which the seat backrest 12 is folded down upon the seat bottom 14.

Figure 2A:
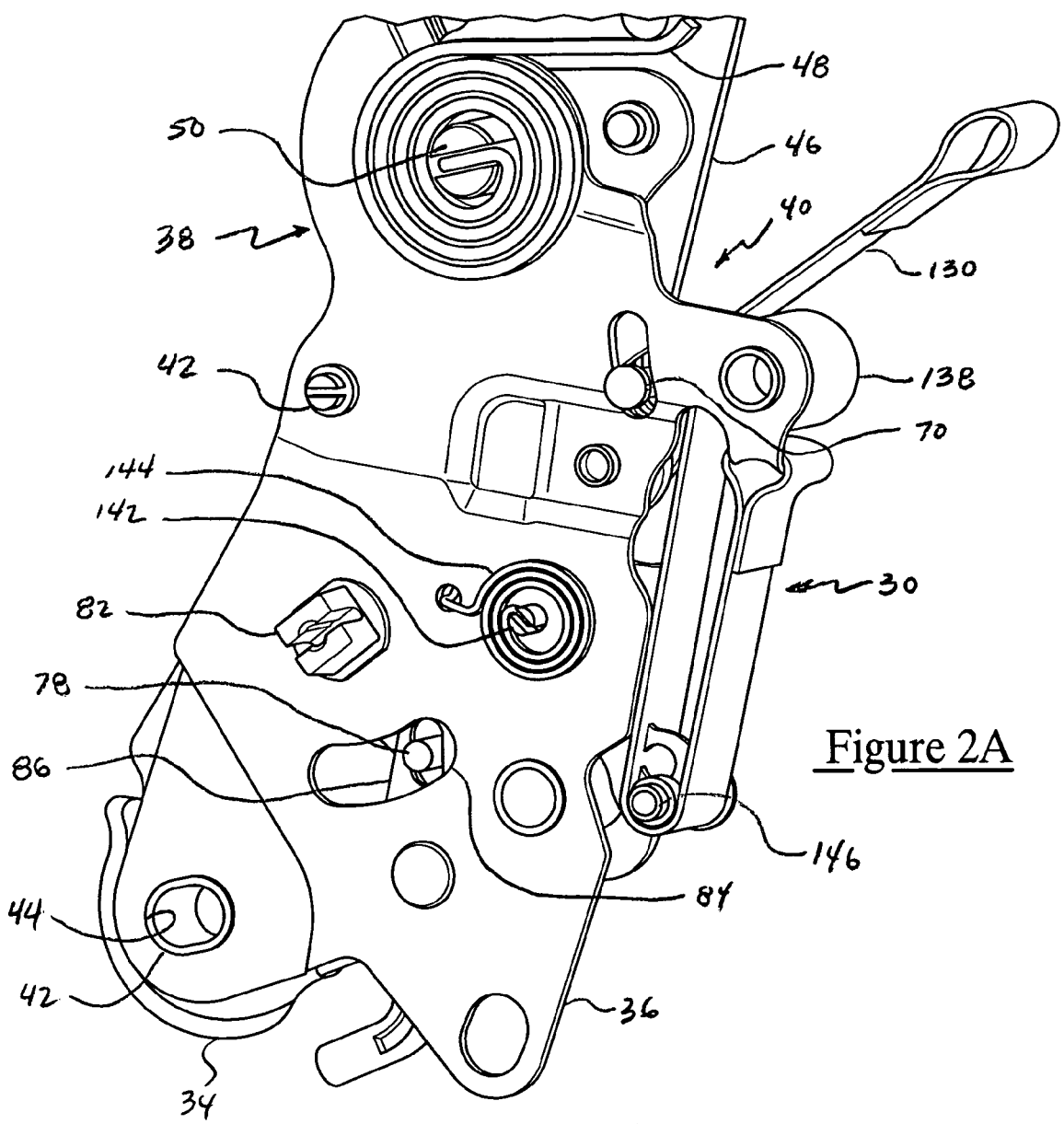
FIG. 2A is a side view of the backrest rotating member and release assembly of the present invention.
Figure 3:
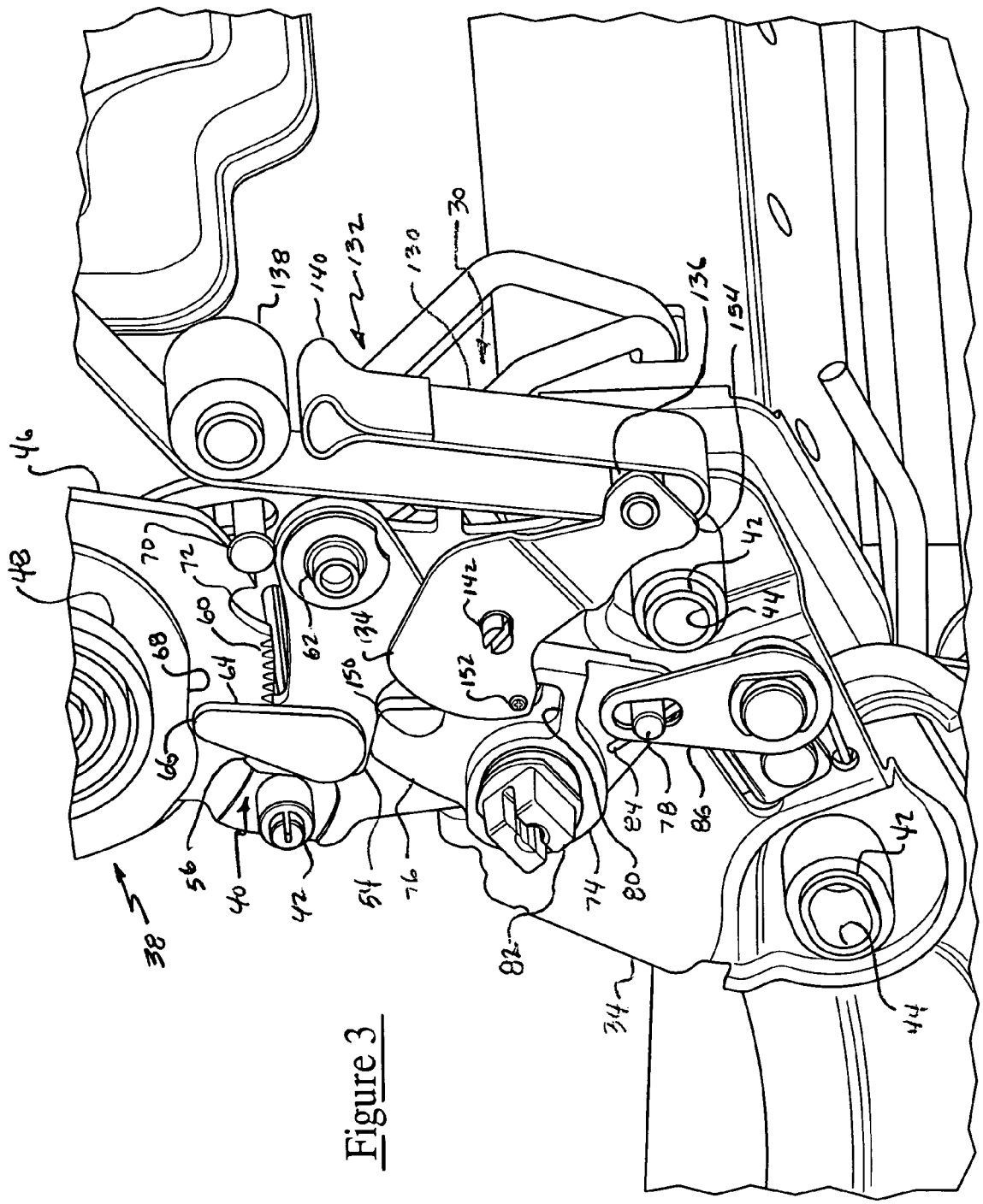
FIG. 3 is side view of the backrest rotating member and release assembly of the present invention with the outer plate removed.
Figure 4:
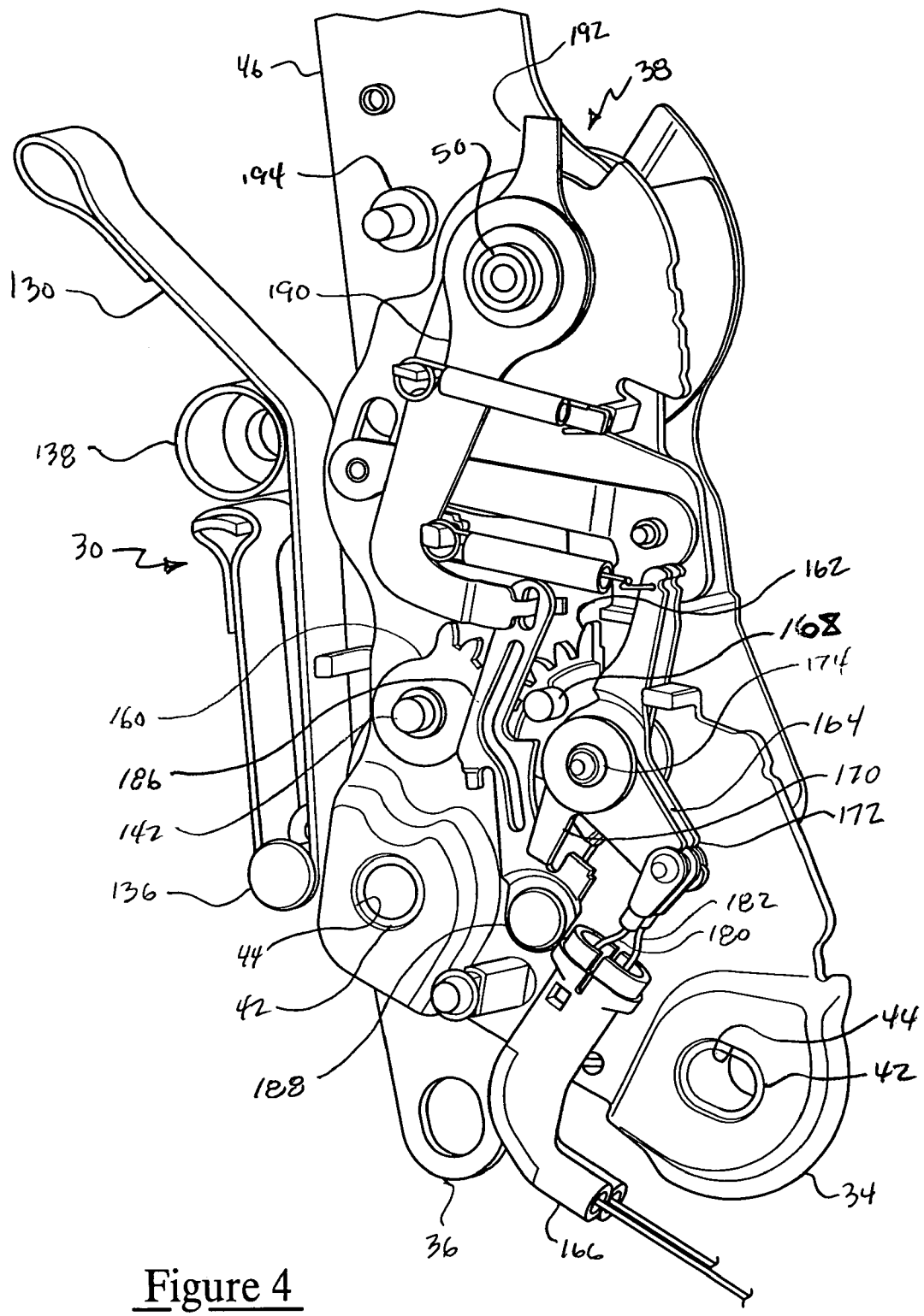
FIG. 4 is a side view of the reverse side of the backrest rotating member and release assembly of the present invention.

As shown in FIGS. 2A, 3, and 4, the seat backrest rotating assembly 28 includes a main plate 34, an outer plate 36, a rotation mechanism, generally indicated at 38, and a first or seat backrest latching mechanism, generally indicated at 40. As will be discussed in greater detail below, the main plate 34 and the outer plate 36 are juxtaposed but operatively spaced from one another by a plurality of spacers 42 to allow the main plate 34 and an outer plate 36 to encompass, and provide support to, portions of the rotation mechanism 38, the first latching mechanism 40, and the release assembly 30. Two of the spacers 42 include open center bores 44 and are disposed in the lower portion of the backrest rotating assembly 28 so that fasteners, (not shown) may be inserted through the center bores 44 into the seat frame 16 or seat pan 24 to retain the seat backrest rotating assembly 28 to the seat frame 16 or seat pan 24.

The rotation mechanism 38 includes a backrest bracket 46 that is fixedly mounted to the backrest frame 32, and a backrest biasing member 48. The backrest bracket 46 includes a pivot pin 50 that is operatively disposed through the main plate 34. In the preferred embodiment, as shown in the Figures, the backrest biasing member 48 is formed as a wound spring and is disposed about pivot pin 50, which is adapted to place a counter clock-wise biasing force on the backrest frame 32 relative to the seat backrest rotating assembly 28. Thus, the backrest biasing member 48 causes rotation of the seat backrest 12 from the upright seating position to its folded position on the seat bottom 14 if the seat backrest 12 is not otherwise restrained.

The seat backrest rotating assembly 28 also supports the first latching assembly 40. The first latching assembly 40 includes a backrest locking arm 54 that has a plurality of sector teeth 56 disposed on its upper edge that corresponds to a plurality of sector teeth 60 on the bottom of the backrest bracket 46. The backrest locking arm 54 is pivotably retained between the main plate 34 and the outer plate 36 on pivot pin 62. The locking arm sector teeth 56 and backrest bracket sector teeth 60 cooperate to lock the seat backrest 12 in its upright position. An alignment arm 64 is mounted to the locking arm 54 to provide lateral support between the locking arm 54 and the backrest bracket 46. The alignment arm 64 also includes a rounded tip 66 that interacts with a shaped surface 68 on the backrest bracket 46 so as to move the locking arm sector teeth 56 away from backrest bracket sector teeth 60 to prevent damage as the seat backrest 12 folds. The latching assembly 40 also includes a locking pin 70 that is biased against the backrest bracket 46. The locking pin 70 is biased to move into the notch 72 when the seat backrest 12 folds to prevent any uncontrolled movement of the seat backrest 12 as the seat bottom 14 is tumbled forward. It should be appreciated that other mechanisms may be employed to allow the seat backrest 12 to be adjustable along the length of sector teeth 56, 60 so that the angle of inclination of the seat backrest 12 is selectively adjustable.

As best seen in FIG. 3, the first latching assembly 40 further includes a release cam 74 that has a blocking arm 76, a drive pin 78, and a release land 80. The release cam 74 is pivotably retained between the main plate 34 and the outer plate 36 by a pivot pin 82. The release cam 74 is rotationally biased by a cam biasing member 84. As shown in FIG. 2A, the cam biasing member 84 places a counter clock-wise biasing force on the drive pin 78 of the release cam 74 so that the blocking arm 76 holds the locking arm sector teeth 56 in engagement with the backrest bracket sector teeth 60 when the seat backrest 12 is in the upright position. A retaining arm 86 fits over the drive pin 78 to support the release cam biasing member 84. In this manner, when the seat backrest 12 is in the upright position, it is latched, or locked in place by the first, or seat backrest latching assembly 40.

As best shown in FIG. 1, the seat frame 16 further includes forward hinge mechanisms, generally indicated at 90 that are disposed on the front members 18. The hinge mechanisms 90 allow the rear members 20 of the seat frame 16 to be rotatively lifted upward and forward and move the seat frame 16 from a seating position to a tumbled position relative to the front members 18 after the seat backrest 12 has been folded down. The seat frame 16 also includes rear floor retention assemblies, generally indicated at 92, that are disposed about the rear members 20 and adapted to latch and selectively retain the seat bottom 14 to the floor of the vehicle in the seated position. The rear floor retention assemblies 92 include a floor pillar 94 having a striker pin 96 and a second or floor latching mechanism, generally indicated at 98. The striker pin 96 is mounted to floor pillar 94.

Figure 2B:
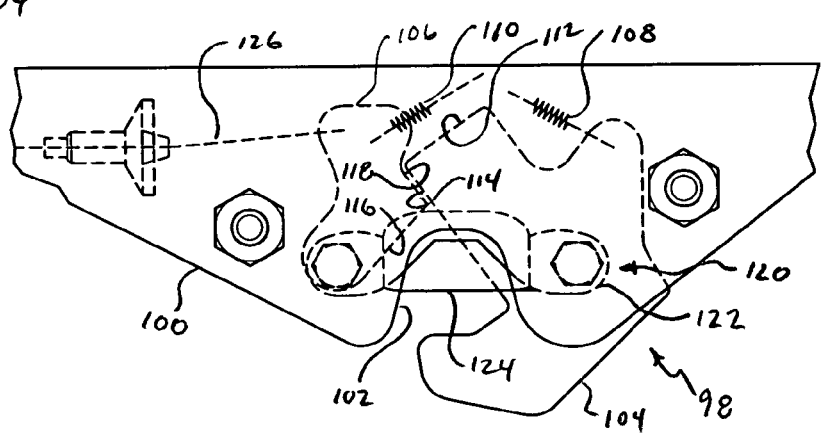
FIG. 2B is a side view of the rear floor retaining assembly of the present invention.

As best shown in FIG. 2B, the second latching mechanism 98 includes a main plate 100 that has a receiving groove 102 formed to accept the striker pin 96, a latching arm 104, and a blocking arm 106. The latching arm 104 and blocking arm 106 are pivotably mounted to the main plate 100 and each include a biasing member 108 and 110, respectively. The latching arm 104 has a general hook shape having an opened latching face 112 and a closed latching face 114. The blocking arm 106 includes a first blocking face 116 and a second blocking face 118. The latching arm 104 is adapted to capture the striker pin 96 in the receiving groove 102 of the main plate 100. The latching arm biasing member 108 provides a biasing force to rotate the latching arm 104 counter clock-wise to open the receiving groove 102 to allow the striker pin 96 to enter the receiving groove 102 when the seat frame 16 is being brought down from the stowed position into the seating position. The blocking arm biasing member 110 provides a biasing force to rotate the blocking arm 106 clock-wise to interact with the latching arm 104.

In the preferred embodiment, the second latching mechanism 98 also includes a shock absorbing assembly, generally indicated at 120. As shown in FIG. 2B, the shock absorbing assembly 120 includes a shell 122 and a resilient member 124. The resilient member 124 is retained in the shell 122 and compresses to accept the striker pin 96. It should be appreciated that the resilient member 124 may be composed of any of a variety of compressible materials used for cushioning and shock absorption that is capable of withstanding the stress loading of a vehicle seat. It should be further appreciated that, as a design consideration, the shock absorbing assembly may be omitted from the second latching mechanism 98 and directly latch the striker pin 96 to the receiving groove 102.

When the seat 10 is moved from the stowed position and the striker pin 96 is received in the receiving groove 102, the latching arm 104 is deflected clock-wise against the biasing force of latching arm biasing member 108. Before the striker pin 96 engages the latching arm 104, the open latching face 112 of the latching arm 104 is in contact with the first blocking face 116 of the blocking arm 106. As the latching arm 104 accepts the striker pin 96 it is subsequently forced closed and the open latching face 112 of the latching arm 104 rotates past the first blocking face 116 of the blocking arm 106. The blocking arm biasing member 110 then causes the blocking arm 106 to rotate clock-wise so that the second blocking face 118 of the blocking arm 106 engages the closed latching face 114 of the latching arm 104. In this manner, the blocking arm 108 holds the latching arm 104 closed about the striker pin 96, thereby latching, or locking the rear of the seat 10 to the vehicle floor. The blocking arms 106 of each of the rear floor retentions assemblies 92 are also operatively connected to the end of a release cable 126 as will be discussed below.

Referring to FIG. 3, the release assembly 30 includes a release member 130 and a pulley assembly, generally indicated at 132. The pulley assembly 132 includes at least one pulley member with the release member 30 operatively wound over the pulley member thereby mechanically increasing the force placed on the release assembly 30 as applied to the release member 130. More specifically, the pulley assembly 132 includes a release lever 134 having a first pulley 136, a second pulley 138, and a stationary attachment point 140. The release lever 134 includes a pivot pin 142 that is rotationally supported by the main plate 34 and outer plate 36 of the seat backrest rotating assembly 28. As best shown in FIG. 2A, a biasing member 144, which is formed as wound spring, operatively provides a clock-wise biasing force to the release lever 134. Further, the release lever 134 includes a distal end 150 having a release pin 152 and a proximate end 154 that rotationally supports the first pulley 136.

In the preferred embodiment, the release member 130 is a flexible strap that is attached at one end to the stationary attachment point 140 and is wound over the first pulley 136 on the release arm 134 and the second pulley 138 to extend outward from the back of the seat 10. In this manner, the release member 130 is available for an operator to pull outward on and cause the seat 10 to fold and tumble. More specifically, the operator pulls outward on the release member 130, which draws on the first pulley 154 rotating the release lever 134 counter clock-wise. This causes the release lever 134 to bring the release pin 152 into contact with the release land 80 of the release cam 74 causing the release cam 74 to rotate clock-wise. The clock-wise rotation of the release cam 74 moves the blocking arm 76 away from the locking arm 54 so that the sector teeth 56, 60 are disengaged and the seat backrest 12 is cause to rotate by the backrest biasing member 48 and the seat backrest 12 folds down upon the seat bottom 14.

Referring now to the release assembly 30 as shown FIG. 4, and viewed from the reverse side, the release assembly 30 also includes a first release gear 160, a second release gear 162, a cable lever 164, and a cable assembly 166. The pivot pin 142 of the release lever 134 passes through the main plate 34 and is fixedly mounted to a first release gear 160. The first release gear 160 meshingly engages the second release gear 162. The second release gear 162 includes an actuating pin 168. Once the release assembly 30 has been initially actuated and the seat backrest 12 has folded down, continued pull on the release member 130 causes the first release gear 160 to rotate clock-wise causing the second release gear 162 to rotate counter clock-wise until the actuating pin 168 contacts the cable lever 164. The cable lever 164 is generally "L"-shaped with a first leg 170 and second leg 172. As the actuating pin 164 of the second release gear 162 continues to move in a counter clock-wise direction, it pushes against the first leg 170 of the cable lever 164 causing the cable lever 164 to rotate counter clock-wise about its pivot point 174. This in turn causes the second leg 172 of the cable lever 164 to move counter clock-wise and pull, or draw on, the two attached cables 180, 182 of the cable assembly 166 that are operatively connected to each of the blocking arms 106 of the rear floor retentions assemblies 92. As shown in FIG. 2B, the pulling action on the cables 180, 182 rotates the blocking arms 106 counter clock-wise so that the latching arms 104 free the striker pins 96 from the receiving grooves 102 of the second latching assemblies 98.

To properly time the two events of folding the seat backrest 12 down upon the seat bottom 14 and the subsequent forward tumbling of the folded seat to the stowed position, a blocking arm 186 is disposed about the second release gear 162 to prevent the rear floor retention assemblies 92 from unlatching without having the seat backrest folded down first. More specifically, as shown in FIG. 4, the blocking arm 186 has one end pivotably mounted to the back of the main plate 34 at 188 and the other end operatively attached to a linkage arm 190. The linkage arm 190 is pivotably mounted to pivot pin 50 of the seat backrest rotating assembly 28. The linkage arm 190 includes a release tab 192 that extends outward from the pivot pin 50 and that is acted upon by a release pin 194 mounted in the backrest bracket 46. As the seat backrest 12 is folded down upon the seat bottom 14, the release pin 194 contacts the release tab 192 causing the linkage arm 190 to rotate clockwise, which moves the blocking arm 186 away from the actuating pin 164 on the second release gear 162 so that the second release gear 162 may continue to rotate counter clockwise to act upon the cable lever 164.

Thus, the physical pulling on the release member 130 by an operator causes the release assembly 30 to sequentially release both the seat backrest 12 and the rear of the seat frame 16. The mechanical advantage inherent in the pulley assembly 132 substantially reduces the pulling force required to be exerted by the operator over what would be required to lift the release arm 134 without the pulley assembly 132.

It should be appreciated that once the release assembly 30 has opened both of the latching mechanisms 40 and 98, the fold and tumble operation of the vehicle seat 10 may be designed as either manually actuated or power assisted events. However, in the preferred embodiment, as previously discussed, the seat backrest 12 will fold down upon the seat bottom 14 by itself under the biasing influence of the backrest biasing member 48 once the release assembly 30 has opened the first latching mechanism 40. Further, the seat frame 16 also includes a seat frame biasing member 196 that is adapted to provide sufficient biasing force to cause the seat bottom 14 to be rotatively lifted upward and forward and move the seat frame 16 from a seating position to a tumbled position relative to the hinge mechanisms 90 after the seat backrest 12 has been folded down upon the seat bottom 14. In the preferred embodiment, as shown in FIG. 1, the vehicle seat of the present invention includes a seat frame biasing member 196 that is a pressurized gas cartridge, which provides a biasing force to assist in tumbling the seat bottom 14 with the folded seat backrest 12 into the stowed tumble position once the rear floor retention assemblies 92 have been released.

Additionally, as shown in FIG. 1, and as a safety feature, the seat assembly 10 may also include a strut assembly 198 that causes the floor pillars 94 to fold down against the vehicle floor as the seat 10 is tumbled forward. This may be employed to provide a clear a path behind the second row seating for unhindered ingress and egress to the third row seating.

The fold and tumble seat assembly 10 of the present invention having a pulley release assembly overcomes the drawbacks and disadvantage of the prior art seat fold and tumble seats by having a release assembly that provides a mechanical advantage to the operator so that the release of the latching mechanisms may be performed with minimal operator input. Further, the vehicle seat of the present invention provides assist to the operator during the release and fold and tumble operations so that little physical effort is required to release the seat from the seating position and move it to the stowed position.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

I claim:

1. A vehicle seat fold and tumble release mechanism comprising:
    a seat backrest rotating assembly adapted to allow a seat backrest to move between an upright position and a folded position in which said seat backrest is folded down upon a seat bottom;
    at least one rear seat floor retention assembly adapted to selectively retain the rear of the seat bottom to the floor of the vehicle;
    a first latching mechanism adapted to latch and selectively retain said seat backrest in said upright position;
    a second latching mechanism adapted to latch and selectively retain said seat bottom to the floor of the vehicle; and
    a release assembly adapted to selectively cause both said first and said second latching mechanisms to be released when said release assembly is actuated, said release assembly having a release member and a pulley assembly to provide a mechanical advantage for operating said release assembly with said release member, wherein said seat backrest rotating assembly includes a backrest bracket and said first latching assembly includes a backrest locking arm that has a plurality of teeth disposed on an upper edge that corresponds to a plurality of teeth on the bottom of said backrest bracket to cooperate and lock said seat backrest rotating assembly in said upright position, an alignment arm mounted to said backrest locking arm to provide lateral support between said backrest locking arm and said backrest bracket, said alignment arm having a rounded tip that interacts with a shaped surface disposed on said backrest bracket so as to move said plurality of teeth of said backrest locking arm away from said plurality of teeth of said backrest bracket to prevent damage as the seat backrest folds, and a release cam having a blocking arm, said release cam rotationally biased so that said blocking arm holds said locking arm teeth in engagement with said backrest bracket teeth when said seat backrest rotating assembly is in the upright position.

2. A vehicle seat fold and tumble release mechanism as set forth in claim 1 wherein said pulley system includes at least one pulley member and said release member is operatively wound over said at least one pulley member of said pulley assembly thereby mechanically increasing the force placed on said release assembly as applied to said release member.

3. A vehicle seat fold and tumble release mechanism as set forth in claim 1 wherein said release member is a flexible member that is operatively wound through said pulley assembly and extends from said seat backrest rotating assembly and is adapted to be pulled outward from said seat backrest rotating assembly to actuate said release assembly.

4. A vehicle seat fold and tumble release mechanism as set forth in claim 1 wherein said first latching assembly further includes a locking pin that is biased against said backrest bracket to move into a notch when said seat backrest rotating assembly folds to prevent any uncontrolled movement of the seat backrest rotating assembly as the seat bottom is tumbled forward.

5. A vehicle seat fold and tumble release mechanism as set forth in claim 1 wherein said release assembly further includes a first release gear operatively rotated by the actuation of said release member;
    a second release gear meshingly engaged with said first release gear and having an actuating pin;
    a cable lever disposed adjacent said second release gear and adapted to be operatively rotated by said actuating pin; and
    a cable assembly having a first end operatively connected to said cable lever and a second end operatively attached to said second latching mechanism adapted to selectively release said seat bottom from the vehicle floor when said release member is actuated.

6. A vehicle seat fold and tumble release mechanism as set forth in claim 5 wherein said release assembly further includes a blocking arm and a linkage arm, said blocking arm disposed about said second release gear adapted to prevent said actuating pin from contacting said cable lever until said seat backrest has folded down upon said seat bottom, said linkage arm operatively attached to said blocking arm and said seat backrest rotating assembly such that as said seat backrest rotating assembly folds down upon said seat bottom said linkage arm causes said blocking arm to move away from said actuating pin on said second release gear so that said second release gear may act upon said cable lever.

7. A vehicle seat fold and tumble release mechanism as set forth in claim 6 wherein said second latching mechanism includes a main plate that has a receiving groove formed to accept a striker pin;

a latching arm formed in a general hook shape adapted to capture said striker pin in said receiving groove; and a blocking arm formed having a first blocking face and a second blocking face, said first and said second blocking faces adapted to interact with said latching arm to hold said latching arm in a latched open position and a latched closed position respectively.

* * * * *